United States Patent [19]

Setzer et al.

[11] 3,758,043

[45] Sept. 11, 1973

[54] STORAGE CARTRIDGE FOR WOUND MATERIAL

[75] Inventors: Henry J. Setzer, East Brunswick, N.J.; George S. Thompson, Newtown, Pa.

[73] Assignee: Dennison Manufacturing Company, Framingham, Mass.

[21] Appl. No.: 86,395

[52] U.S. Cl. ............. 242/55 R, 206/52 R, 242/68.7
[51] Int. Cl. ........................ B65h 75/20, B65d 85/04
[58] Field of Search ............... 242/68.7, 55.2, 55.53, 242/138, 146, 55; 206/53, 54, 52 R

[56] References Cited

UNITED STATES PATENTS

| | | | |
|---|---|---|---|
| 714,963 | 12/1902 | Steinkamp | 206/53 |
| 923,255 | 6/1909 | Flemister | 242/68.7 |
| 3,420,464 | 1/1969 | Rudzitis et al. | 242/55 X |

*Primary Examiner*—Billy S. Taylor
*Attorney*—George E. Kersey

[57] ABSTRACT

A storage cartridge for a coil of embossing tape. The cartridge is in the form of a partial ring with a relatively wide and short head and a long and narrow body. The tape is maintained within the cartridge by side lobes which are also positioned to permit the cartridge to be accommodated by a wide variety of embossing machines.

8 Claims, 6 Drawing Figures

INVENTORS HENRY J. SETZER
GEORGE S. THOMPSON
BY George E. Kersey
ATTORNEY

STORAGE CARTRIDGE FOR WOUND MATERIAL

BACKGROUND OF THE INVENTION

This invention relates to the storage of coils of material, and more particularly to the storage of coils of tape used with embossing machines.

An embossing machine selectively produces raised characters upon deformable tape that is typically fed into the machine from a cartridge that is either mounted upon the machine or positioned within an internal compartment.

The requirements on the cartridge vary widely from one type of machine to another. This is because a cartridge that is designed for a particular type of machine must take into account the various internal lugs and bosses of its storage compartment. The result is that a cartridge which is specially designed for one type of machine generally will not be suitable for a different type of machine.

Accordingly, it is a principal object of the invention to simplify the production of storage cartridges, particularly for tape embossing machines. A related object is to achieve a tape storage cartridge which is suitable for a wide variety of machines.

Embossing tape cartridges of conventional design are generally in the form of enclosed two-part magazines which receive the tape and are folded over to realize the desired structure. Since the wall which is parallel to the width of the tape is formed in two pieces, it does not possess the desired degree of rigidity. In addition, the fact that the cartridge is largely enclosed means that it requires excess material and the use of a complex mold. Moreover, the loading of such a cartridge requires the preliminary coiling of the tape, followed by its insertion into one part of the magazine, and the folding of the latter.

Accordingly, another object of the invention is to achieve greater cartridge rigidity in a direction parallel to the width of the stored material. Still another object is to economize on the amount of material used in the production of storage cartridges. A further object is to simplify the mold design of cartridges for the storage of coiled materials. A still further object of the invention is to realize a tape cartridge which can be loaded with tape directly instead of requiring preliminary coiling, followed by insertion of the coiled tape into the cartridge.

SUMMARY OF THE INVENTION

In accomplishing the foregoing and related objects, the invention provides a storage cartridge in the form of a shell which partially encloses the outer layer of a coil of material and is interrupted by an access opening for the coil. Portions of the shell have at least the same width as the maximum width of coil used in the machine which employs the cartridge. This permits the cartridge to be accommodated by embossing machines with cartridge storage compartments in which there are internal members that are separated by the maximum coil width. The shell includes, on alternate sides, a plurality of side lobes for engaging and retaining the coil within the cartridge. The side lobes are appropriately proportioned and staggered to permit the cartridge to be received by various kinds of machines.

In accordance with one aspect of the invention, the shell of the cartridge is flexible and has a cylindrical configuration corresponding to the outer layer of the coil being stored. The cylinder extends from one side of the access opening to the other.

In accordance with another aspect of the invention, the cartridge has a head that extends from one side of the access opening over a portion of the shell circumference and desirably has side slots for securing the cartridge within the storage compartment of one type of embossing machine. The result is that the cartridge is secured near the access opening from which the tape is dispensed. The body of the cartridge, which is narrower than the head and of substantially the same width as the maximum coil width, extends from the head to the other side of the access opening.

In accordance with a further aspect of the invention, the open-sided configuration of the cartridge permits the coil of embossing tape to be stored directly by being wound in the cartridge.

In accordance with a still further aspect of the invention, the cartridge has side lobes in the form of truncated sectors with sides which are coincident with radii of the cylindrical shell. For one embodiment of the invention there are three staggered lobes along one edge of the shell, and two on the other edge, with two paris of the lobes being approximately diametrically opposed.

BRIEF DESCRIPTION OF THE DRAWINGS

Other aspects of the invention will become apparent after considering an illustrative embodiment of the invention, taken in conjunction with the drawings in which.

DETAILED DESCRIPTION OF AN ILLUSTRATIVE EMBODIMENT

Figure 1:
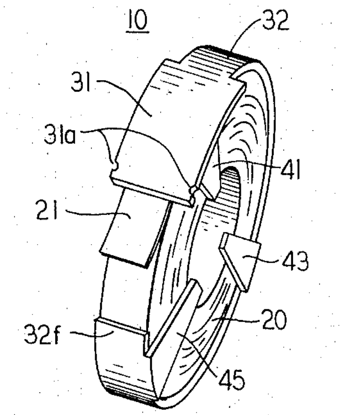
FIG. 1 is a perspective view of a loaded tape cartridge in accordance with the invention.

Turning to the drawings, a storage cartridge 10 in accordance with the invention is shown in FIG. 1 loaded with a coil 20 of material. Illustratively, the material of the coil 20 is embossing tape. When the cartridge 10 is suitably positioned in an embossing machine (not shown), the tape 20 is controllably advanced and selectively embossed with raised characters.

The configuration of the cartridge 10 permits it to be accommodated by a wide variety of embossing machines. In addition, the tape 20 is easily laoded into the cartridge 10 and, once loaded, is readily accessible.

Forming the cartridge 10 is a flexible shell which is cylindrical expect for an access opening through which an end 21 of the tape 20 protrudes. The shell has a relatively wide, but circumferentially short, head 31 and a narrower, but circumferentially extended, body 32.

The tape 20 is retained within the shell 31–32 by various side lobes of which three side lobes 41, 43 and 45 on one side of the cartridge 10 are visible in FIG. 1. Because of the open-sided construction of the cartridge 10, it is readily loaded by having the embossing tape 20 coiled in place.

Moreover, since the cartridge 10 has a relatively wide head portion 31, it is readily accommodated by one type of embossing machine (not shown). For that type of machine the head portion has head slots 31*a* which are engaged by positional lugs in the storage compartment of the machine.

On the other hand, because of the relatively narrow body 32 of the cartridge 10, it can be accommodated by other types of embossing machines as well, for example machines which hold the cartridge 10 in place by ribs that have the same spacing as the tape width. For such machines, the spacing of the lobes 41, 43 and 45 along the periphery of the shell 31–32 provides regions where the ribs of the storage compartment can be received without interfering with the lobes.

Figure 2:
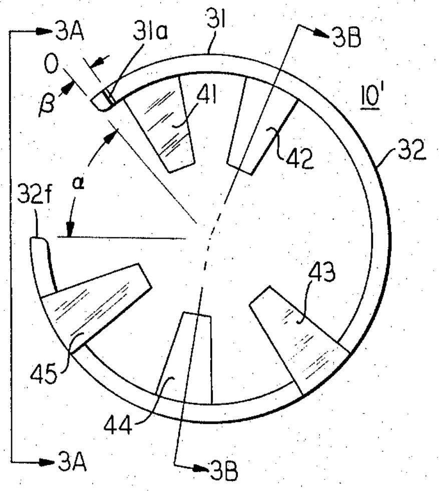
FIG. 2 is a side view of an unloaded tape cartridge in accordance with the invention.

Structural details of an unloaded cartridge 10' in accordance with the invention are shown in FIG. 2. The cartridge 10' desirably has side lobes 41 through 45 which alternate from side to side beginning with a side lobe 41 near one side of the access opening on the near side of the cartridge and terminating with another side lobe 45 near the other side of the access opening. Thus, two of the lobes 42 and 44 are on the far side of the cartridge 10', while the remainder are on the near side. The lobes 41 through 45 collectively retain the tape (not shown in FIG. 2) within the cartridge 10' and are additionally spaced to permit the cartridge 10' to fit into a large number of different types of tape embossing machines. Two pairs of the lobes 41 and 43, and 42 and 44 are approximately diametrically opposite to prevent stored coils of tape from tumbling from the cartridge 10'. The lobes 41 through 45 are truncated sectors having sides that are coincident with radii of the cylindrical shell 31–32 and their bases at the circumference of the cartridge 10'. This provides a lobe configuration which is desirable for engaging various lugs and bosses that are commonly found in the storage compartments of various embossing machines.

In an illustrative embodiment of the invention, measuring in a clockwise direction from the origin 0 of FIG. 2, the position of the first encountered (leading) edge of the first lobe 41 was at an arc distance of 10 degrees while the corresponding leading edge of the second side lobe 42 was at an arc distance of 55°. Continuing in a clockwise direciton, the leading edges of the remaining lobes 43, 44 and 45 were at respective arc distances of 171°, 222° and 274°.

The access opening $\alpha$ for the cartridge 10' is smaller than the diameter of the tape which is coiled within the cartridge. This prevents the coiled tape from accidentally being removed through the access opening. At the same time the access opening is desirably large in order to reduce the amount of surface that is contacted by the outer coil of the tape, and hence the friction as the tape is fed from the cartridge. In one illustrative embodiment of the invention the angle $\alpha$ was 48°. To further reduce friction, the inner edges of the head and the free end 31*f* of the body 32 are rounded.

Also as shown in FIG. 2, the side slots 31*a* in the head 31 are near the access opening $\alpha$. For those machines which are able to hold the cartridge in a compartment by lugs which mate with the slots 31*a*, their location near the access through which the tape is fed promotes stability of the cartridge within the compartment. In an illustrative embodiment of the invention the center line of the slots 31*a* was at a clockwise angle $\beta$ from the origin 0 of 12°.

Figure 3A:
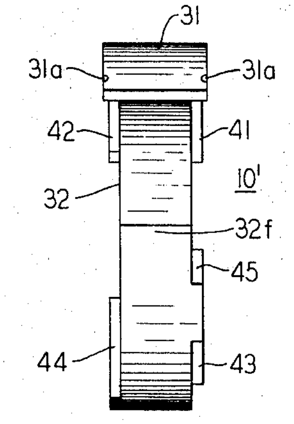
FIGS. 3A and 3B are respective front and cross-sectional view of the unloaded tape cartridge of FIG. 2.
Figure 3B:
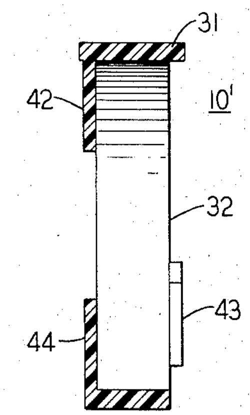

A front view of the unloaded cartridge 10', which is advantageously molded of polypropylene homopolymer plastic, is given in FIG. 3A. This view shows the staggered positioning of the side lobes 41 through 45. As can be seen from the cross-sectional view of FIG. 3B, the lobes are integrally molded with the shell 31–32, but they can be cemented in place instead.

Figure 4A:
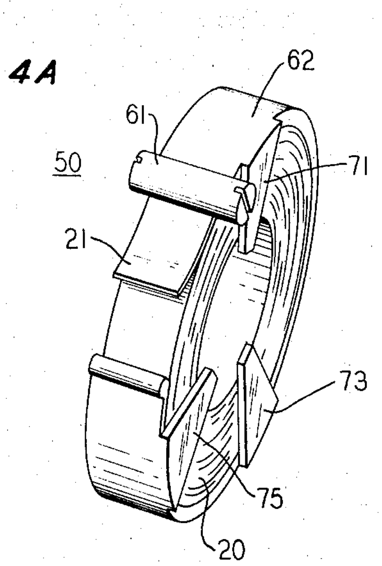
FIGS. 4A and 4B are perspective and side views respectively of an alternative loaded and unloaded tape cartridge in accordance with the invention.

An alternative embodiment of the cartridge 10 of FIG. 1 is represented by the tape-loaded cartridge 50 of FIG. 4A, which has a short head 61 and a narrow, circumferentially extended body 62. A coil of embossing tape 20, with an access end 21, is retained within the shell 61–62 by various side lobes, of which three side lobes 71, 73 and 75 are visible in FIG. 4A. The remaining side lobes 72 and 74 are shown for the unloaded cartridge 50' of FIG. 4B.

It will be appreciated that while the side lobes 41 through 45 of FIG. 2 are shown to be of equal length, they may have different lengths and positions in accordance with the characteristics of the embossing machines with which the cartridge is used. For example, in the alternative cartridge 50' of FIG. 4B the second lobe 72 is foreshortened and the remaining lobes 71, 73, 74 and 75 are of equal length. In an illustrative embodiment of the invention with a foreshortened side lobe 72, the arc distance was 65°, and the angle of the access opening was 43°. The arc distances of the remaining side lobes were as in the embodiment of FIG. 2.

Figure 4B:
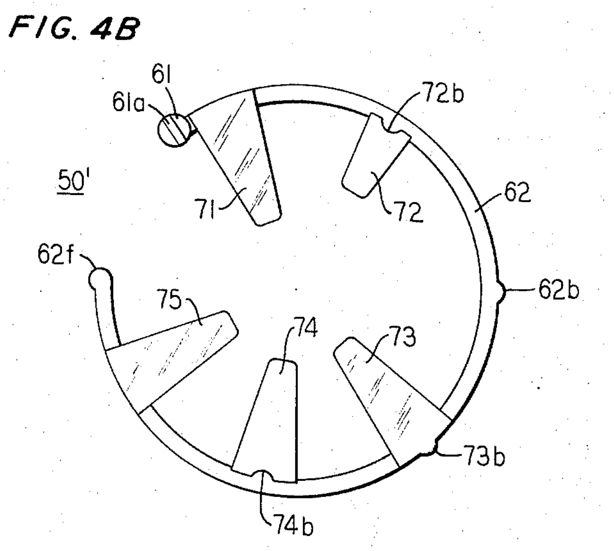

In the course of molding the cartridge 50' of FIG. 4B, it is desirable to include various ejector pins in the shell 61–62. These pins are in the form of partial cylindrical bosses which are included to free the cartridge from its mold. Thus, bosses 72*b* and 74*b* are included with the far side lobes 72 and 74 and have a curvature, which if extended would be tangential to the outer diameter of the shell 61–62; while other bosses 73*b* and 62*b* can be included with the intermediate lobe 73 and between that lobe and the adjoining lobe 72, with a curvature, which if extended, would be tangential to the inner diameter of the shell 61–62. Finally head and free end bosses 61 and 62f tangential to the inner diameter of the shell 61–62 are included at both edges of the access opening. The head 61 is formed entirely by a transverse cylindrical boss centered upon slots 61*a*.

While various aspects of the invention have been set forth by the drawings and the specification, it is to be understood that the foregoing detailed description is for illustration only and that various changes in parts, as well as the substitution of equivalent constituents for those shown and described, may be made without departing from the spirit and scope of the invention as set forth in the appended claims.

We claim:

1. A cartridge for storing a layered coil of material usable with a machine, comprising a rim-shaped body for partially enclosing the outer layer of the coil within the edges of said body and interrupted by an access opening therefor, said body having a head which projects outwardly from said edges for permitting the attachment of the cartridge to the machine, and a plurality of side lobes disposed on alternate edges of said body for retaining said coil therein.

2. A storage cartridge as defined in claim 1 wherein said body has substantially the same width over portions thereof as the maximum width of coil used with the machine.

3. A cartridge for storing a layered coil of material usable with a machine, comprising a rim-shaped shell interrupted by an access opening for partially enclosing the major periphery of the outer layer of the coil, a plurality of side lobes on each of the opposed edges of said shell, each lobe being alternately staggered on said opposed edges for retaining said coil therein, and said shell having a head portion at one side of said access opening and a narrower body portion extending from said head portion to the other side of said access opening, said head portion having side slots therein for engaging lugs to secured said cartridge in a storage compartment of one type of embossing machine.

4. A storage cartridge as defined in claim 1 wherein said head includes a cylindrical boss.

5. A tape cartridge as defined in claim 1 wherein said head adjoins said access opening.

6. A tape cartridge as defined in claim 3 wherein said side lobes are truncated sectors having their bases on the circumference of said cartridge.

7. A tape cartridge as defined in claim 6 wherein there are five side lobes, three being staggered on one side of said cartridge and the remaining two being staggered on the other side thereof.

8. A tape cartridge as defined in claim 7 wherein said side lobes include two pairs thereof, each including diametrically opposed side lobes on opposite side of said cartridge.

* * * * *